(12) United States Patent
Pasternak

(10) Patent No.: US 7,212,067 B2
(45) Date of Patent: May 1, 2007

(54) VOLTAGE REGULATOR WITH BYPASS FOR MULTI-VOLTAGE STORAGE SYSTEM

(75) Inventor: John Pasternak, Santa Clara, CA (US)

(73) Assignee: Sandisk Corporation, Milpitas, CA (US)

( * ) Notice: Subject to any disclaimer, the term of this patent is extended or adjusted under 35 U.S.C. 154(b) by 0 days.

(21) Appl. No.: 10/633,110

(22) Filed: Aug. 1, 2003

(65) Prior Publication Data
US 2005/0024128 A1   Feb. 3, 2005

(51) Int. Cl.
*G05F 1/10*   (2006.01)
*G05F 3/02*   (2006.01)

(52) U.S. Cl. .................................................. 327/541
(58) Field of Classification Search ............... 327/538, 327/540, 541, 543, 544; 365/189.09, 226
See application file for complete search history.

(56) References Cited

U.S. PATENT DOCUMENTS

| | | | |
|---|---|---|---|
| 4,373,117 A | 2/1983 | Pierce | 363/17 |
| 4,833,341 A | 5/1989 | Watanabe et al. | 327/541 |
| 5,121,007 A | 6/1992 | Aizaki | 327/544 |
| 5,184,031 A * | 2/1993 | Hayakawa et al. | 327/544 |
| 5,327,388 A | 7/1994 | Kobayashi | 365/226 |
| 5,329,491 A | 7/1994 | Brown et al. | 365/226 |
| 5,373,477 A * | 12/1994 | Sugibayashi | 365/226 |
| 5,490,117 A | 2/1996 | Oda et al. | 365/226 |
| 5,566,121 A | 10/1996 | Hadderman et al. | 365/222 |
| 5,602,462 A | 2/1997 | Stich et al. | 323/250 |
| 5,615,328 A | 3/1997 | Hadderman et al. | 395/182.2 |
| 5,625,280 A | 4/1997 | Voldman | 323/284 |
| 5,632,039 A | 5/1997 | Walker et al. | 395/750 |
| 5,696,465 A | 12/1997 | Ishizuka | 327/544 |
| 5,814,980 A | 9/1998 | Lewis | 327/311 |
| 5,818,781 A | 10/1998 | Estakhri et al. | 365/226 |
| 5,894,244 A | 4/1999 | Ukita | 327/541 |
| 5,903,501 A | 5/1999 | Kurosaki | 365/189.05 |
| 5,909,586 A | 6/1999 | Anderson | 395/750 |
| 5,973,521 A | 10/1999 | Kim et al. | 327/112 |
| 6,075,741 A | 6/2000 | Ma et al. | 365/226 |
| 6,163,170 A | 12/2000 | Takinomi | 326/81 |
| 6,181,118 B1 | 1/2001 | Meehan et al. | 323/274 |
| 6,198,683 B1 | 3/2001 | Ishii et al. | 327/536 |
| 6,329,873 B2 * | 12/2001 | Morishita | 327/541 |

(Continued)

*Primary Examiner*—Quan Tra
(74) *Attorney, Agent, or Firm*—Vierra Magen Marcus & DeNiro LLP

(57) ABSTRACT

A system and method for supplying power to a peripheral device where the voltage supplied by a host device may be the voltage required for operation of the peripheral, or a higher voltage. A memory system includes a voltage regulator including an input, and output and a bypass shorting the input to the output. A voltage detector communicates with the regulator. A Bypass enable signal operable responsive to a signal generated by the host device indicating that the power up of the host is complete is coupled to the bypass element. A method for operating a voltage regulator in a memory system includes the steps of: providing a voltage regulator having an input and an output, and including a bypass shorting the input to the output; setting the bypass to off prior to power up of a host device; responsive to a power up completion signal from a host device, determining the power supplied by the host; and if the power supplied by the host is below a threshold operating voltage, enabling the bypass.

36 Claims, 4 Drawing Sheets

U.S. PATENT DOCUMENTS

| | | | |
|---|---|---|---|
| RE37,593 E * | 3/2002 | Etoh et al. | 365/189.09 |
| 6,420,924 B1 | 7/2002 | Lundberg | 327/333 |
| 6,452,854 B1 * | 9/2002 | Kato et al. | 365/226 |
| 6,462,992 B2 | 10/2002 | Harari et al. | 365/185.33 |
| 6,795,366 B2 * | 9/2004 | Lee | 365/226 |
| 2002/0105837 A1 | 8/2002 | Kim et al. | 365/189.09 |
| 2002/0157039 A1 | 10/2002 | Ihara | 714/25 |
| 2003/0132733 A1 | 7/2003 | Hijikata | 320/149 |

* cited by examiner

VOLTAGE REGULATOR WITH BYPASS FOR MULTI-VOLTAGE STORAGE SYSTEM

BACKGROUND OF THE INVENTION

1. Field of the Invention

The present invention is directed to voltage regulation in multivoltage supply applications, and in particular, for peripheral devices such as memory systems.

2. Description of the Related Art

Non-volatile semiconductor memory is popular for a number of uses, including cellular telephones, digital cameras, personal digital assistants, mobile computing devices, non-mobile computing devices, audio and video players and other appliances. Electrical Erasable Programmable Read Only Memory (EEPROM) and flash memory are among the most popular non-volatile semiconductor memory types.

Typical applications include the provision of one more arrays of storage elements in a memory card system, such as a memory card, which is then inserted in a host device. Both EEPROM and flash memory utilize arrays of storage elements to store one or more bits of data per element. Each element generally includes a floating gate that is positioned above and insulated from a channel region and a semiconductor substrate. The floating gate is positioned between source and drain regions. A control gate may be provided over and insulated from a floating gate. The threshold voltage of each memory transistor is controlled by the amount of charge that has retained on the floating gate. That is, the minimum amount of voltage that must be applied to the control gate before a transistor is turned on to permit conduction between its source entering is controlled by the level of charge on the floating gate. Many EEPROMs and flash memories have a floating gate that is used to store two ranges of charges and, therefore, the memory cell can be programmed/erased between two states. Such memory cells store one byte of data. Other EEPROMs and flash memory cells store multiple ranges of charge and, therefore, such memory cells can be programmed to store multiple states. Such memory cells store multiple bytes of data.

Improvements in processing technology have led to smaller transistor device sizes. This in turn has led to lower power supply requirements in each successive generation of transistor technology. For example, a 0.25 micron process device operates on a voltage of approximately 2.5 volts, a 0.18 micron process uses a 1.8 v (+/−10%) supply, a 0.15 micron process will use a 1.5 (+/−10%) volt supply, 0.13 micron technology a 1.2 v (+/−10%) supply, and so on.

Unfortunately, not all host devices supply the requisite power required by such technology. For example, older hosts may supply 3 volts to a memory system requiring only 1.8 volts. Thus, memory devices constructed with newer technologies must allow for the possibility that the host device in which they are used will supply a higher voltage used with legacy products. Hence power level detection and voltage regulation techniques are used to provide the correct voltage to the memory device.

Another consideration is that most regulators impose a significant voltage drop when a substantial current is drawn from the device. A voltage regulator designed to step down a legacy voltage will experience a current drop if a lower than expected voltage is supplied at the input. For example, in a conventional voltage regulator, a 3 volt host has sufficient head room to supply high current to a 1.8 volt device, but a 1.8 volt host can not supply high current with low drop to a 1.8 volt device; the output would be too low.

SUMMARY OF THE INVENTION

The present invention, roughly described, pertains to a system and method for supplying power to a peripheral device where the voltage supplied by a host device may be the voltage required for operation of the peripheral, or a higher voltage.

In one aspect, the invention is a memory system including a control path to a host device supplying a voltage. The system includes a voltage regulator including an input, an output and a bypass shorting the input to the output. Additionally, a voltage detector communicating with the regulator is provided. A bypass enable signal operable responsive to a signal generated by the host device indicating that the power up of the host is complete is coupled to the bypass element.

In a further aspect, the invention comprises a method for operating a voltage regulator in a memory system. In this aspect, the method comprises the steps of: providing a voltage regulator having an input and an output, and including a bypass shorting the input to the output; setting the bypass to off prior to power up of a host device; responsive to a power up completion signal from a host device, determining the power supplied by the host; and if the power supplied by the host is below a threshold operating voltage, enabling the bypass.

In yet another aspect, the invention comprises a peripheral device for a host system including a voltage regulator circuit. The device may include a voltage regulator having an input and an output, and a bypass element coupled to selectively short the input to the output. A bypass control signal is provided which is coupled to the bypass element and responsive to a host system power up completed signal. The bypass control signal enables the bypass element when the voltage provided by the host is below a threshold level.

In a still further aspect, the invention comprises a memory system. The system includes a controller, a memory array; and a voltage regulator. The regulator has a shorting element between an input and an output responsive to a bypass control signal. The bypass control signal is provided by the controller responsive to a host system power up complete signal which enables the bypass element when a host supply voltage provided by the host is below a threshold level.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

The invention is suitable for use with a non-volatile memory system. The system may be utilized with any number of types of host devices such as cellular telephones, digital cameras, personal digital assistants, mobile computing devices, non-mobile computing devices and other devices. One typical host device is a computer system. It should be recognized that the system shown in FIG. 1 is exemplary and any number of devices may serve as hosts for the memory card, including digital cameras, music players, computers, and the like.

Figure 1:
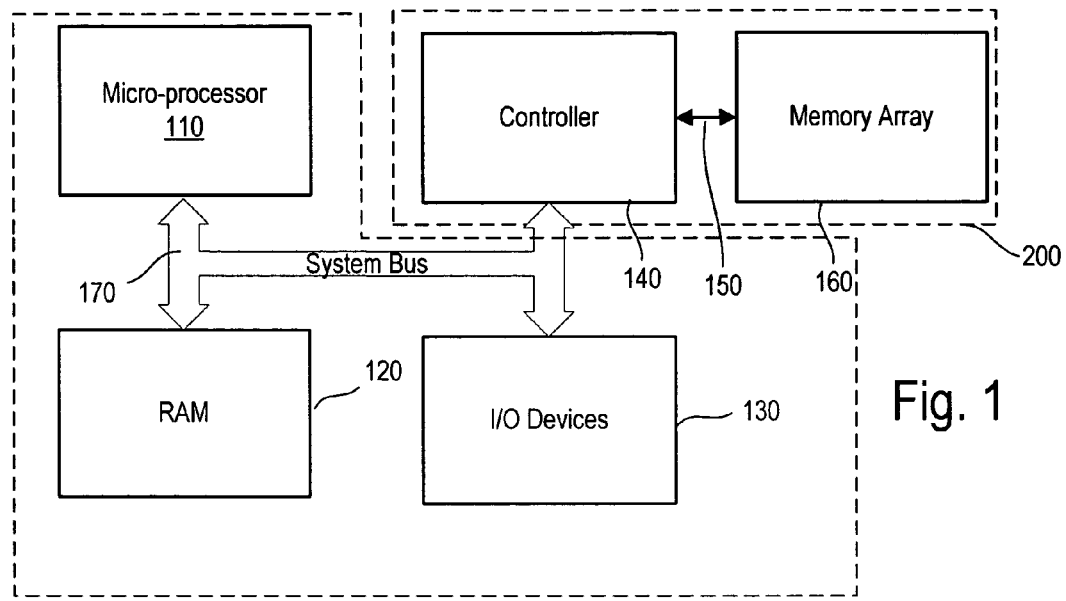
FIG. 1 depicts a block diagram of a computer system suitable for use as a host system for the memory card of the present invention.

A computer system in which the various aspects of the present invention may be incorporated is illustrated generally in FIG. 1. A typical computer system architecture includes a microprocessor 110 connected to a system bus 170, along with random access, main system memory 120, and at least one or more input-output devices 130, such as a keyboard, monitor, modem, and the like. Generally, one or more non-volatile storage systems are coupled to the system bus 170 as well. Typically, such a memory is a disk drive and the data stored thereon is retrieved into the system volatile memory 120 for use in current processing, and can be easily supplemented, changed or altered.

Figure 2:
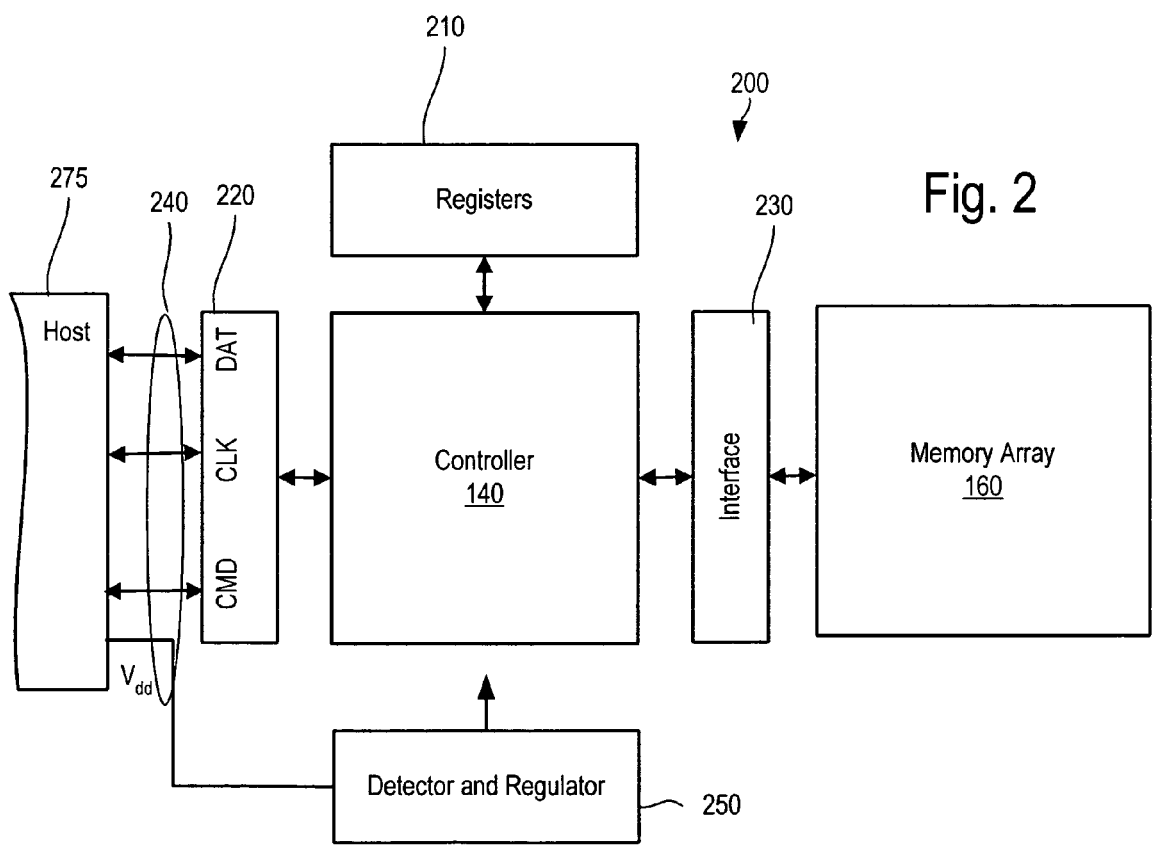
FIG. 2 depicts a block diagram of a memory card architecture.

A storage memory system 200 is also shown as coupled to the system bus 170. System 200 is constructed of a memory controller 140, connected to the computer system bus 170, and a memory array 160, which may be comprised of EEPROM integrated circuit chips. Data and instructions are communicated from the controller 140 to the memory array 160 primarily over a data line 150. Other control and status circuits between the controller 140 and the array 160 are shown in FIG. 2. The controller 140 is preferably formed primarily on a single integrated circuit chip. The memory array 160 may include a number of EEPROM integrated circuit chips.

FIG. 2 is a more detailed block diagram of an exemplary memory system. The architecture shown in FIG. 2 is similar to that used for a multimedia card (MMC) system. However, it will be recognized that the invention is not limited to memory systems using the MMC architecture, but finds applicability in any application where the operating voltage required by the elements of a peripheral device is fixed, but the host device supply voltage may be the required operating voltage or a higher voltage. This includes memory systems such as PC Cards, Compact Flash cards, Secure Digital Cards as well as Smart Media and Memory Stick devices.

In the memory system 200, various lines of the memory system buses of FIG. 1 are terminated in connecting pins of a card for connection with the rest of the computer system through a connector. In the block diagram of FIG. 2, a memory card 200 will be coupled to a host system 275 by a bus 240. The bus may include a number of signals which are coupled directly to memory card 200. In the multimedia card (MMC) specification, seven pins are used. In the compact flash (CF) specification, 50 pins are used. Other memory system technologies use various forms of connectors, but generally all supply an operating voltage to the peripheral memory system.

In FIG. 2, only four of the signals provided by the host are shown: the command response signal (CMD), the clock signal (CLK), and the data signal (DAT) are provided from host 275 to an interface driver 220. Also shown provided by the host 275, is the supply voltage $V_{DD}$. Interface driver 220 communicates with the controller 140. Controller 140 is coupled to a series of storage registers 210.

The command signal is a bidirectional command channel used for card initialization and data transfer commands. The command signal has two operation modes: open-drain for initialization mode and push-pull for fast command transfer. Commands may be sent from the multimedia card bus master to the card and responses send from the cards to the host 275. The data signal is a bidirectional data channel. The data signal operates in a push-pull fashion. Two additional supply voltage ground signals from the host 275 to card 200 and a reserved signal make up the seven pins in an MMC card. It should be understood that any number of different storage cards 200 may be utilized in the system of the present invention.

Registers 210 store information for controller 140. In an MMC specification, five registers are defined and include an operation conditions register (OCR) stores the $V_{DD}$ voltage profile of the card and a driver stage register (DSR) can be used to improve best performance for extended operating conditions.

Controller 140 communicates via a memory core interface 230 with memory array 160 to read and write data to and from the array. Any number of different types of arrays, controllers interfaces, and registers may be utilized in accordance with the present invention, and operation of memory systems of this type is well documented.

Also shown in FIG. 2 is voltage detector and regulator circuitry 250. The detector and regulator 250 of the present invention ensures that the correct voltage for operating memory card 200 is supplied to the card, irrespective of the host voltage.

Figure 3:
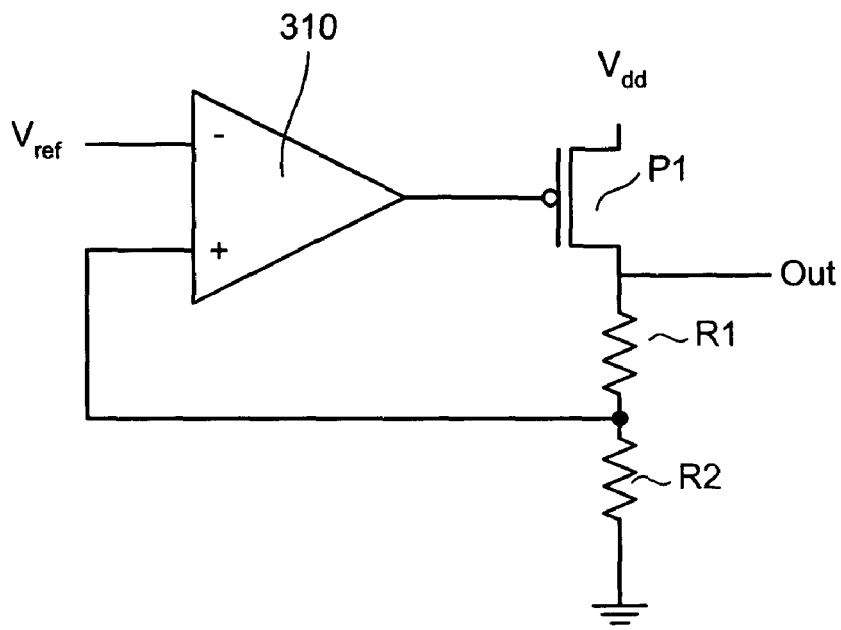
FIG. 3 is a schematic diagram depicting an example of a conventional voltage regulator used in memory cards.

FIG. 3 shows a standard voltage regulator 300. Voltage regulator 300 includes a comparator 310, a PMOS transistor P1, and resistors R1 and R2. A reference voltage ensures that the supply voltage $V_{DD}$ passing from the source of transistor P1 to the drain of transistor P1 and the output of the device (OUT) is regulated to the supply voltage required at the output. As is well known in the art, voltage regulator 300 maintains a precise voltage using precision reference voltage $V_{REF}$ to set the output voltage (OUT). An automatic controller such as amplifier 310 is used to adjust the drive of the control element P1. Resistors R1 and R2 feed a fraction of the regulator output to the comparator's negative input. The comparator that adjusts the drive to transistor P1 so that the voltage is related to the reference voltage using well known techniques.

A problem occurs with the voltage regulator of FIG. 3 if the input voltage $V_{DD}$ is significantly less than expected. While voltage regulator 300 will operate correctly for an expected, higher voltage, for example 3 volts, relative to a target regulated voltage of 1.8 v, it will fail to supply a sufficient current if the voltage input is much lower, for example 1.8 volts.

Figure 4:
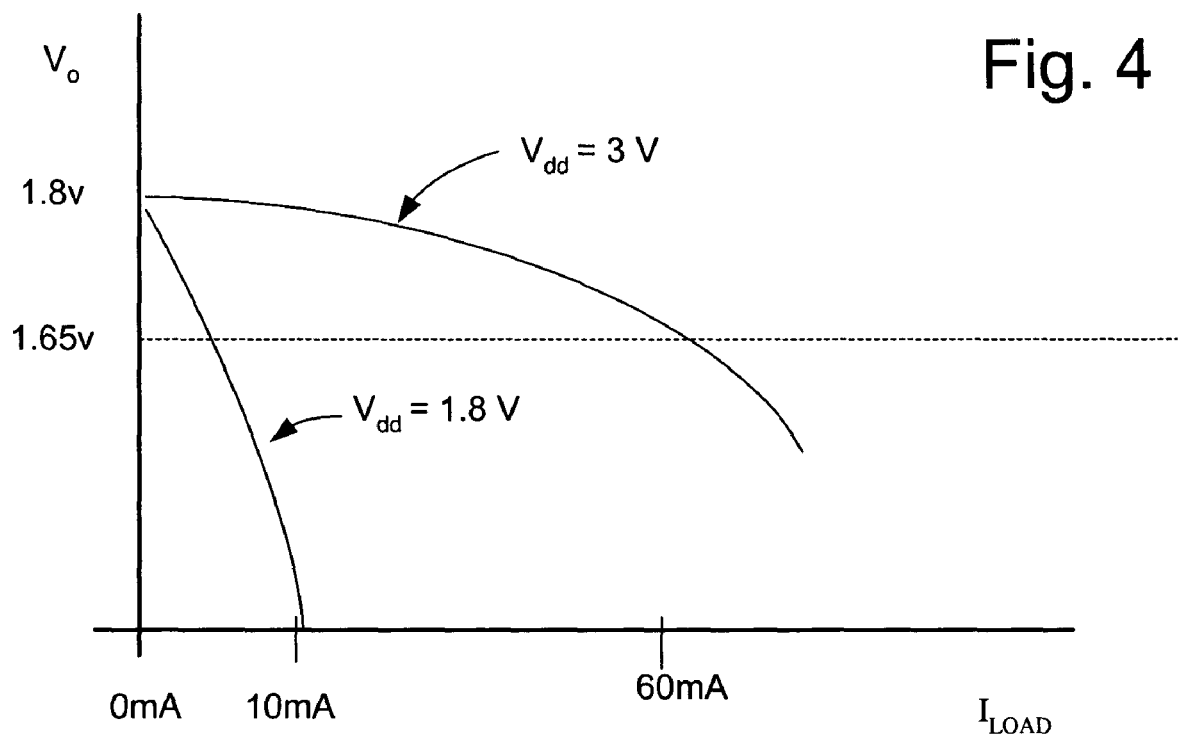
FIG. 4 is a graph depicting the output voltage versus the current load for two input voltages to the voltage regulator of FIG. 3.

This is exemplified in FIG. 4 which is a graph of the voltage output $V_O$ versus the load current ($I_{load}$) for two supply voltages $V_{DD}$ equals 3 volts in $V_{DD}$ equals 1.8 volts in the voltage regulator of FIG. 3. As noted above, a nominal operating voltage for a 1.8 volt device is 1.65 volts, represented by the dashed line on the vertical scale of FIG. 4. For a supply voltage $V_{DD}$ of 3 volts, the output current of the voltage regulator of FIG. 3 is sufficient to meet the required minimal current for operating the device and the output voltage is still above a threshold required for operating the device. If the voltage input $V_{DD}$ changes to 1.8 volts, the performance curve drops dramatically, and the output current drops significantly to, for example, 10 mili-amps. In this case, the supply voltage is insufficient to power the memory system.

Figure 5:
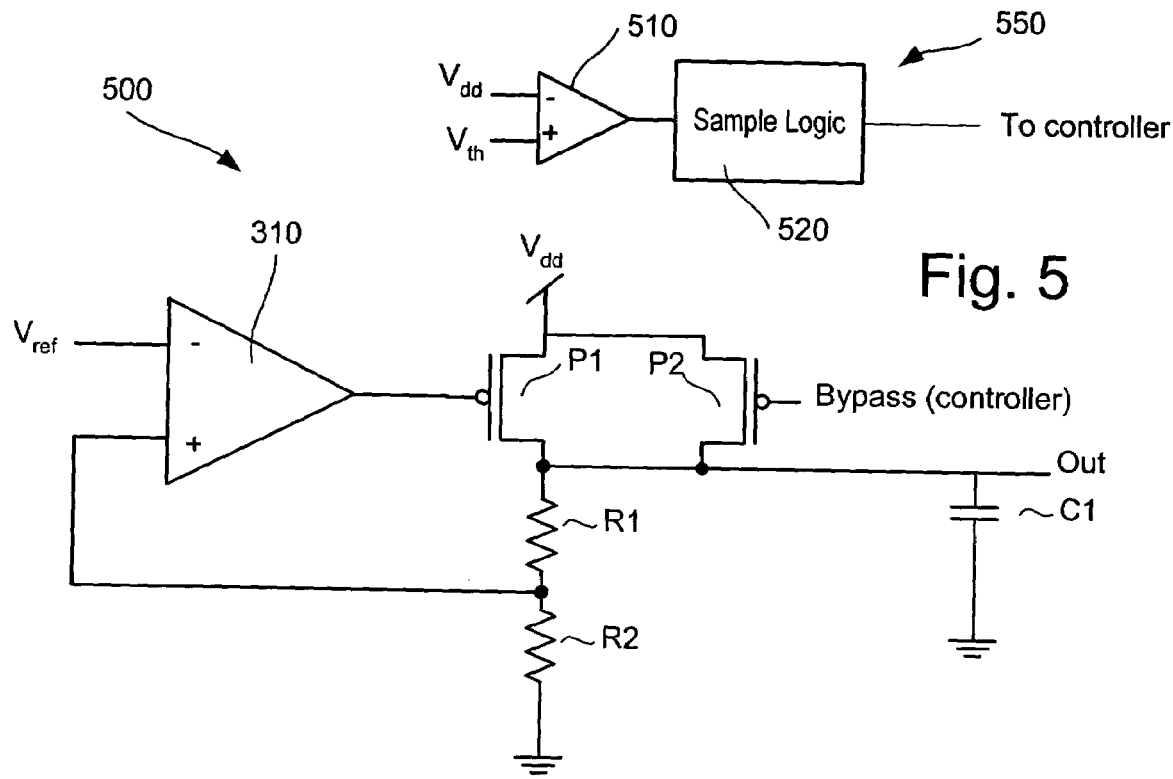
FIG. 5 is a voltage regulator of the present invention.

FIG. 5 shows a first embodiment of voltage regulator suitable for use in the present invention. Elements having the same characterization as those set forth in FIG. 4 are numbered in the same manner.

As shown in FIG. 5, a bypass transistor P2 has been added to the configuration of FIG. 3. The elements of the regulator shown in FIG. 5 other than the bypass element P2 are exemplary; it should be understood that the particular circuitry used to regulate the supply voltage relative to the output of the regulator is not critical to the invention. As will be understood from the following description, the ability to short the supply voltage at the input to the output in any regulator configuration is utilized to implement the invention.

Voltage regulator 500 allows a variance in the input voltage to accommodate hosts delivering a supply voltage sufficient to directly power a memory system (or other peripheral) and hosts providing legacy supply voltages, higher than that required by the memory system. Also shown in FIG. 5 is a smoothing capacitor C1 which, for values operating in the range of 1.8 volts, may have a value of approximately 1 micro-farad. Upon application of a BYPASS signal, under the direction of the controller 160, the bypass transistor shorts the input voltage between $V_{DD}$ and the output. Thus, in cases where the input voltage is sufficient to operate the memory system, the bypass is enabled and the voltage is provided directly to the output. In cases where the voltage is significantly higher, the voltage regulator is allowed to operate normally to reduce the voltage supplied to the output.

Figure 6:
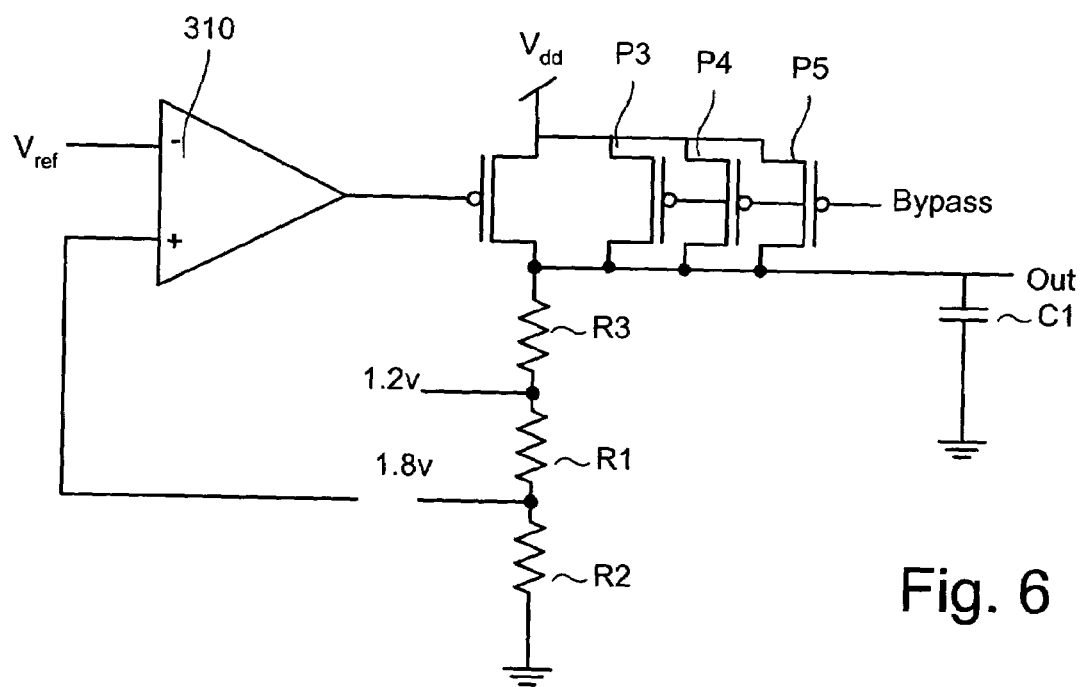
FIG. 6 is another voltage regulator of the present invention.

Also shown in FIG. 5 is detector circuitry 550, including a low voltage detection comparator 510 and sampling logic 520 which provides an output signal which can be read by controller 140. Low voltage comparator 510 provides an output signal which is high when the $V_{DD}$ input for the memory card is below a given threshold voltage $V_{TH}$. This logic in conjunction with the voltage regulator 500 of FIGS. 5 and 600 of FIG. 6 is utilized to control voltage regulation in the present invention. The logic determines whether the voltage supplied is that of the higher voltage legacy devices, or the required supply voltage of the memory system.

FIG. 6 shows an alternative embodiment to the voltage regulator shown in FIG. 5. At FIG. 6, additional transistors P4, P5, and P3 are shown. The additional transistors are indicated to show an alternative for ensuring that shorting VDD and the output by coupling all three transistors in the shorting path between VDD and the output is ensured. In addition, additional resistors R3 is provided so that the voltage feedback returned to comparator 310 may be selected to have the regulator provide any of a number of suitable supply voltages at the output. By applying different feedback voltages, the voltage regulator of FIG. 6 may be adapted for multiple variable voltage settings. For example, the regulator in FIG. 6 shows the fractional voltage returned to comparator 310 at 1.8 volts or 1.2 volts. Obvious variations of the configuration of the regulator of FIGS. 5 and 6 to allow for step-down of various input voltages will be readily apparent to one of average skill in the art.

Figure 7:
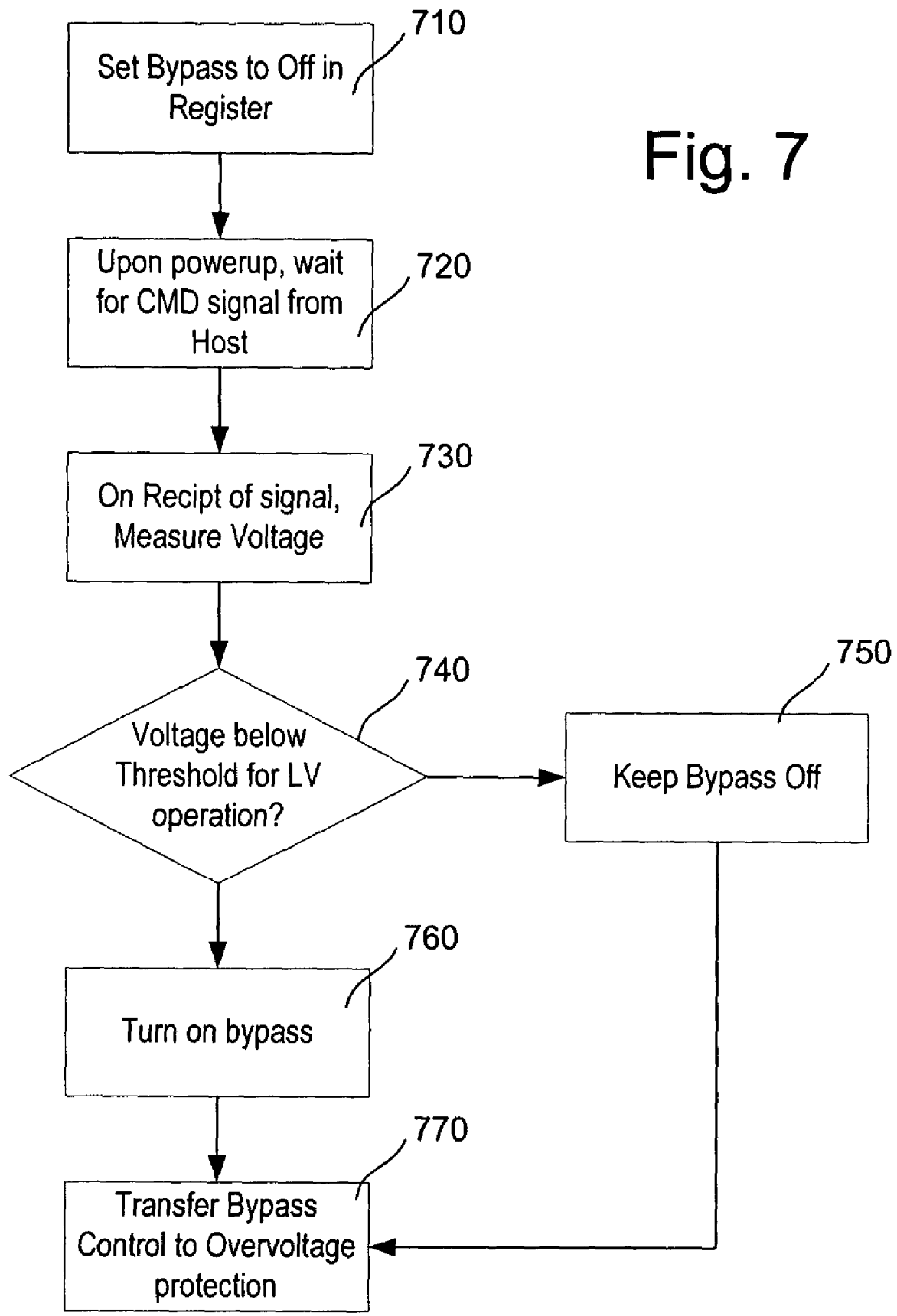
FIG. 7 is a flowchart depicting one method of operating the voltage regulator of the present invention.

FIG. 7 shows a method for operating the voltage regulator of FIG. 5 or 6 in accordance with the invention. In general, the method assumes that the supply voltage will be high and allows the host to power up based on that assumption, leaving the bypass device disabled during this phase. A control signal from the host is then utilized to indicate power-up completion, and the output of the sampling logic then used to determine whether to implement the BYPASS signal.

Assume, for example, that a memory system operable at 1.8 volts is to be used. Upon attaching to the system, the system is not aware of whether the supply voltage will be 1.8 volts or greater. At Step 710, initially, the controller sets the bypass of transistor P2 to disabled, to ensure that memory array will not be damaged for the case of higher 3 volt operation. When a host device powers up, the ramp of the host's power over time can vary widely. The ramp may be extremely steep, indicating a rapid power up, or may be more lengthy over time.

Next, at step 720, with the bypass set to off, the controller waits for a indicator signal from the host device that power up has been completed. In one embodiment, the threshold voltage is 2.4 volts, distinguishing between 1.8 volt +/−10% operation or 3.0 volt +/−10% operation. In a further embodiment, where the device is an MMC card, this signal may be CMD0 or CMD1, the initial two commands sent by a host to an MMC card which are generally used to reset all cards to idle state and request and confirm operating conditions. In other technologies, any initial signal indicating the completion of power up of the host device, specifically designed for that purpose or indicating completion by its nature may be used as the indicator signal.

Next, at Step 730, upon receipt of the power up signal from the host device, the sampling logic 520 will test the output of the low voltage comparator 510. If the output of comparator 510 is high, this indicates that a voltage below the threshold voltage $V_{th}$ is present. If the output is low, the $V_{DD}$ input will have exceeded the threshold voltage indicating a higher voltage.

At Step 740, is below the threshold LV comparator voltage, then the output of the comparator will be high and the bypass will be turned on at Step 760. If the output is low, then at Step 750, the bypass will be set to off.

When in bypass mode, most memory cards provide over voltage protection which disables any active bypass devices whenever high voltage is later supplied. This will protect the memory core in the event the user changes the supply from, for example, 1.8 volts to 3.0 volts without using the normal power down reset required in the MMC protocol.

Normally, in many devices, the maximum internal voltage is limited so as not to pose a reliability issue with respect to the memory core. No restriction on supply ramp rates is required when using a sufficient capacitance for C1.

In cases where the output of the low voltage comparator 510 is high, the regulator can be shut off later by firmware in the controller to save power.

Finally, at Step 770, bypass control will be transferred to the over voltage protection normally found in the memory systems described herein.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A memory system including a control path to a host device, the host device supplying a host voltage having a level suitable for operation of the memory system and a power up complete signal indicating that the host voltage has reached the level, comprising:
   a voltage regulator including a host voltage input, an output and a bypass shorting the host voltage at the input to the output;
   a controller;
   a voltage detector communicating with the regulator and the controller;
   a bypass enable signal output by the controller subsequent to the power up complete signal being generated by the host device indicating that the host voltage has reached the level.

2. The memory system of claim 1 wherein the power up complete signal generated by the host device provided via the control path.

3. The memory system of claim 1 wherein the bypass is at least one transistor.

4. The memory system of claim 3 wherein the bypass comprises a plurality of transistors.

5. The memory system of claim 3 wherein the bypass enable signal is provided by the controller to a gate of the transistor.

6. The memory system of claim 1 wherein the signal generated by the host device is a command signal to the memory system.

7. The memory system of claim 1 wherein the memory system is a multimedia card.

8. The memory system of claim 1 wherein the memory system is a multimedia card and the signal generated by the host device is a command signal.

9. The memory system of claim 8 wherein the command signal is CMD0 or CMD1.

10. The memory system of claim 2 wherein the voltage detector outputs a bypass enable signal shorting the input voltage to the output when the host supply voltage is below a threshold.

11. The memory system of claim 1 wherein the memory system is a pc card.

12. The memory system of claim 1 wherein the memory system is a compact flash card.

13. The memory system of claim 1 wherein the memory system is a secure digital card.

14. The memory system of claim 1 wherein the memory system is a smart media card.

15. The memory system of claim 1 wherein the memory system is a memory stick.

16. A method for operating a voltage regulator in a memory system including a controller, comprising:
   providing a voltage regulator having a host voltage input and an output, and including a regulator bypass responsive to the controller shorting the host voltage at the input to the output responsive to an enable signal;
   setting the bypass to off prior to power up of a host device;
   responsive to a power up completion signal from a host device to the controller, the power up completion signal indicating that the host voltage is at a level suitable for operation of the memory system, determining the power supplied by the host; and
   if the power is below a threshold operating voltage, enabling the bypass using the controller.

17. The method of claim 16 wherein the bypass is a transistor and the step of setting the bypass to off includes providing a signal to a gate of the transistor.

18. The method of claim 17 wherein the bypass comprises a plurality of transistors and the step of enabling the bypass comprises applying an enable signal to each gate of said plurality of transistors.

19. The method of claim 17 wherein the power up completion signal is a command signal from the host.

20. The method of claim 19 wherein command signal is CMD0 or CMD1 for a multimedia card.

21. The method of claim 17 wherein the threshold voltage is below 2.7 volts.

22. The method of claim 17 wherein the threshold voltage is below 2.0 volts.

23. The method of claim 17 wherein the threshold voltage is below 1.65 volts.

24. The method of claim 17 wherein the threshold voltage is below 1.3 volts.

25. A peripheral device for a host system supplying a host voltage, the peripheral device including a voltage regulator circuit and a controller, comprising:
   a voltage regulator having a host voltage input and an output;
   a bypass element coupled to selectively short the host voltage at the input to the output;
   a bypass control signal output from the controller coupled to the bypass element and responsive to a host system power up completed signal indicating that the host voltage is at a level suitable for operation of the memory system and which enables the bypass element when the host voltage is below a threshold level subsequent to host power-up completion.

26. The peripheral device of claim 25 wherein the regulator includes a detector responsive to the power up completed signal.

27. The peripheral device of claim 26 wherein the detector outputs a first signal when the voltage provided by the host is above the threshold level and a second signal when the host is below the threshold level.

28. The peripheral device of claim 25 wherein the bypass element includes at least one p-type transistor.

29. The peripheral device of claim 27 wherein the bypass control signal is applied to the gate of the at least one transistor.

30. The peripheral device of claim 27 wherein the bypass element is disabled during power up of the host device.

31. The peripheral device of claim 25 wherein the bypass control signal is provided by a controller.

32. A method for operating a voltage regulator in a multimedia card memory device, comprising:
   providing a voltage regulator having a host voltage input and an output, a controller, and including a regulator bypass shorting a host voltage at the input to the output;
   setting the bypass to off prior to power up of a host device;
   responsive to a command signal from the host device indicating that the host voltage is at a level suitable for operation of the memory system, determining the power supplied by the host; and
   if the power is below a threshold operating voltage subsequent to the command signal, enabling the bypass using the controller.

33. The method of claim 32 wherein command signal is CMD0 or CMD1 for a multimedia card.

34. A memory system, comprising:
a controller;
a memory array; and
a voltage regulator having a shorting element between a host voltage input and an output, the shorting element being responsive to a bypass control signal, the bypass control signal provided by the controller responsive to a host system power up complete signal indicating that the host voltage is at a level suitable for operation of the memory system which enables the shorting element when the host supply voltage provided by the host is below a threshold level subsequent to power-up completion.

35. The memory system of claim 34 wherein the regulator outputs a voltage less than the host supply voltage when said supply voltage is above said threshold.

36. The memory system of claim 35 wherein the regulator outputs at least a first or a second output voltage when said host supply voltage is above said threshold.

* * * * *